United States Patent
Patel et al.

(10) Patent No.: US 10,724,471 B2
(45) Date of Patent: Jul. 28, 2020

(54) INTEGRATED CONTROL SYSTEM FOR ENGINE WASTE HEAT RECOVERY USING AN ORGANIC RANKINE CYCLE

(71) Applicant: CUMMINS INC., Columbus, IN (US)

(72) Inventors: Prashant P. Patel, Greenwood, IN (US); Prashaanth Ravindran, Indianapolis, IN (US); Christopher R. Nelson, Columbus, IN (US); Leon A. LaPointe, Columbus, IN (US)

(73) Assignee: Cummins Inc., Columbus, IN (US)

( * ) Notice: Subject to any disclaimer, the term of this patent is extended or adjusted under 35 U.S.C. 154(b) by 70 days.

(21) Appl. No.: 16/060,512

(22) PCT Filed: Dec. 21, 2015

(86) PCT No.: PCT/US2015/066989
§ 371 (c)(1),
(2) Date: Jun. 8, 2018

(87) PCT Pub. No.: WO2017/111886
PCT Pub. Date: Jun. 29, 2017

(65) Prior Publication Data
US 2019/0003419 A1  Jan. 3, 2019

(51) Int. Cl.
*F02G 5/04* (2006.01)
*F02B 41/10* (2006.01)
(Continued)

(52) U.S. Cl.
CPC .............. *F02G 5/04* (2013.01); *F02B 41/10* (2013.01); *F02B 63/044* (2013.01); *F02C 6/12* (2013.01);
(Continued)

(58) Field of Classification Search
CPC .......... F02B 63/044; F02B 41/10; F02C 6/12; F02G 2260/00; F02G 5/04; Y02T 10/166
See application file for complete search history.

(56) References Cited

U.S. PATENT DOCUMENTS 4,182,127 A * 1/1980 Johnson .................... F02G 5/04
                                                          417/364
7,269,956 B2   9/2007 Gericke et al.
(Continued)

OTHER PUBLICATIONS

International Search Report from corresponding PCT Application Publication No. WO2017/111886, dated Feb. 25, 2016, pp. 1-2.
(Continued)

*Primary Examiner* — Jesse S Bogue
(74) *Attorney, Agent, or Firm* — Foley & Lardner LLP

(57) ABSTRACT

An engine waste heat recovery (WHR) system includes a turbocharger WHR portion, an exhaust WHR portion, an expander in the exhaust WHR portion, a condenser, valves, and a controller. The expander receives a working fluid in a superheated form and converts thermal energy in the working fluid into mechanical energy or electrical energy. The condenser condenses the working fluid for recirculation through the engine WHR system. The recuperator is fluidly coupled between the expander and the condenser to allow the working fluid to flow from the expander to the condenser. The recuperator transfers thermal energy to a flow of the working fluid from the turbocharger WHR portion. Each valve is fluidly coupled to one of the turbocharger WHR portion and the exhaust WHR portion. The controller is electrically coupled to the valves, and the controller selectively controls the valves to selectively circulate the working fluid through the engine WHR system.

14 Claims, 3 Drawing Sheets

(51) Int. Cl.
*F02B 63/04* (2006.01)
*F02C 6/12* (2006.01)

(52) U.S. Cl.
CPC ......... *F02G 2260/00* (2013.01); *Y02T 10/166* (2013.01)

(56) References Cited

U.S. PATENT DOCUMENTS

| | | | | |
|---|---|---|---|---|
| 8,196,862 B2* | 6/2012 | Brooks | ............... | F02B 29/0412 |
| | | | | 123/559.1 |
| 8,245,491 B2* | 8/2012 | Horek | ............... | F28D 9/00 |
| | | | | 60/39.182 |
| 8,302,399 B1* | 11/2012 | Freund | ............... | F01N 5/02 |
| | | | | 60/605.1 |
| 8,584,457 B2* | 11/2013 | Kardos | ............... | F01P 3/20 |
| | | | | 60/599 |
| 8,683,801 B2* | 4/2014 | Ernst | ............... | F01K 23/065 |
| | | | | 60/615 |
| 8,707,914 B2* | 4/2014 | Barnes | ............... | F01P 3/16 |
| | | | | 123/252 |
| 8,776,517 B2 | 7/2014 | Ernst et al. | | |
| 8,850,814 B2 | 10/2014 | Kaplan et al. | | |
| 8,938,964 B2* | 1/2015 | Kanou | ............... | F01K 7/22 |
| | | | | 60/618 |
| 9,217,338 B2* | 12/2015 | Ernst | ............... | F01K 23/065 |
| 9,518,497 B2* | 12/2016 | Tricaud | ............... | F01N 5/02 |
| 9,810,129 B2* | 11/2017 | Zhou | ............... | F22B 1/1807 |
| 2006/0231235 A1* | 10/2006 | Yamanaka | ............... | F01N 5/02 |
| | | | | 165/51 |
| 2010/0139626 A1 | 6/2010 | Raab et al. | | |
| 2010/0287934 A1* | 11/2010 | Glynn | ............... | F01K 17/06 |
| | | | | 60/645 |
| 2010/0319346 A1* | 12/2010 | Ast | ............... | F01K 23/04 |
| | | | | 60/616 |
| 2012/0042656 A1* | 2/2012 | Donnelly | ............... | F01K 17/06 |
| | | | | 60/772 |
| 2012/0285167 A1* | 11/2012 | Horek | ............... | F28D 9/00 |
| | | | | 60/618 |
| 2012/0285169 A1 | 11/2012 | Freund et al. | | |
| 2013/0068202 A1 | 3/2013 | Kardos et al. | | |
| 2013/0283784 A1 | 10/2013 | Uzkan et al. | | |
| 2014/0060044 A1* | 3/2014 | Gonze | ............... | F01N 3/101 |
| | | | | 60/615 |
| 2014/0137554 A1 | 5/2014 | Ernst et al. | | |
| 2014/0311141 A1* | 10/2014 | Mori | ............... | F02G 5/00 |
| | | | | 60/599 |
| 2015/0121866 A1 | 5/2015 | Xia | | |
| 2015/0275698 A1 | 10/2015 | Kawai | | |
| 2017/0122254 A1* | 5/2017 | Urch | ............... | B60K 6/24 |

OTHER PUBLICATIONS

Written Opinion from corresponding PCT Application Publication No. WO2017/111886, dated Feb. 25, 2016, pp. 1-9.

* cited by examiner

US 10,724,471 B2

INTEGRATED CONTROL SYSTEM FOR ENGINE WASTE HEAT RECOVERY USING AN ORGANIC RANKINE CYCLE

CROSS-REFERENCE TO RELATED APPLICATIONS

This application is the U.S. National Stage of PCT Application No. PCT/US2015/066989, filed Dec. 21, 2015, the contents of which are incorporated herein by reference in their entirety.

TECHNICAL FIELD

The present disclosure relates to waste heat recovery systems associated with internal combustion engines.

BACKGROUND

In operation, internal combustion engines discharge heat energy into the external environment through exhaust gas, engine cooling systems, charge air cooling systems, etc. The discharged heat energy that is not used to perform useful work is typically known as "waste heat." Waste heat recovery systems capture a portion of the waste heat to perform useful work, such as generating electrical energy via an expander (e.g., a turbine). Some waste heat recovery systems utilize a Rankine cycle. The Rankine cycle is a thermodynamic process in which heat is transferred to a working fluid in a Rankine cycle circuit. The working fluid is pumped to a boiler where it is vaporized. The vapor is passed through an expander and then through a condenser, where the vapor is condensed back to a fluid. The expander may drive a generator to generate electrical energy, or transfer mechanical energy through a belt drive to engine crankshaft. An organic Rankine cycle is a Rankine cycle in which the working fluid is an organic, high molecular mass fluid with a liquid-vapor phase change (boiling point) at a lower temperature than that of water. Such a fluid enables heat recovery from relatively lower temperature sources relative to other Rankine cycle systems.

SUMMARY

In one set of embodiments, an engine waste heat recovery system includes a turbocharger waste heat recovery portion, an exhaust waste heat recovery portion, an expander in the exhaust waste heat recovery portion, a condenser, valves, and a controller. The expander receives a working fluid in a superheated form and converts thermal energy in the working fluid into mechanical energy or electrical energy. The condenser condenses the working fluid for recirculation through the engine waste heat recovery system. The recuperator is fluidly coupled between the expander and the condenser to allow the working fluid to flow from the expander to the condenser. The recuperator transfers thermal energy to a flow of the working fluid from the turbocharger waste heat recovery portion. Each valve is fluidly coupled to one of the turbocharger waste heat recovery portion and the exhaust waste heat recovery portion. The controller is electrically coupled to the valves, and the controller selectively controls the valves to selectively circulate the working fluid through the engine waste heat recovery system.

In another set of embodiments, an engine waste heat recovery system includes a turbocharger waste heat recovery portion configured to circulate a working fluid, an exhaust waste heat recovery portion configured to circulate the working fluid, an expander in the exhaust waste heat recovery portion, a recuperator, valves, and a controller. The expander receives the working fluid in a superheated form and converts thermal energy in the superheated working fluid to mechanical or electrical energy. The recuperator is fluidly coupled to the expander and to the turbocharger waste heat recovery portion. The recuperator receives the working fluid from the expander, receives the working fluid from the turbocharger waste heat recovery portion, transfers thermal energy from the working fluid received from the expander to the working fluid received from the turbocharger waste heat recovery portion, and provides the working fluid to the exhaust waste heat recovery portion. Each of the valves is fluidly coupled to one of the turbocharger waste heat recovery portion and the exhaust waste heat recovery portion. The controller controls the valves and controls a flow rate of the working fluid in the waste heat recovery system, to regulate a temperature of a Rankine cycle implemented in the exhaust waste heat recovery portion.

In still another set of embodiments, a method for waste heat recovery includes controlling a pump to initiate fluid circulation through a waste heat recovery system thermally coupled to an engine. The method further includes, responsive to receiving a first fluid temperature measurement of the waste heat recovery system at a first predefined value, controlling a first valve to direct a portion of the fluid circulating in a turbocharger portion of the waste heat recovery system to a recuperator; and responsive to receiving a second fluid temperature measurement of the waste heat recovery system at a second predefined value, controlling a second valve to direct a portion of the fluid flowing in the waste heat recovery system to an exhaust portion of the waste heat recovery system.

In still another set of embodiments, a controller for controlling waste heat recovery in an engine system includes circuitry to: control a pump to initiate fluid circulation through a waste heat recovery system thermally coupled to an engine; responsive to receiving a first fluid temperature measurement of the waste heat recovery system at a first predefined value, control a first valve to direct a portion of the fluid circulating in a turbocharger portion of the waste heat recovery system to a recuperator; and responsive to receiving a second fluid temperature measurement of the waste heat recovery system at a second predefined value, control a second valve to direct a portion of the fluid flowing in the waste heat recovery system to an exhaust portion of the waste heat recovery system.

DETAILED DESCRIPTION

Described in the present disclosure are techniques for waste heat recovery (WHR) based on a recuperative organic Rankine cycle (ORC), where the ORC is integrated into a two-stage, turbocharged engine. Waste heat is recovered to generate power through an expander. Waste heat may be recovered from engine exhaust and/or from one or more engine charge air coolers in a turbocharger. Power generated by the expander can be transferred back into the system to effect a conservation of energy. Power may be transferred, for example, by converting the power into mechanical energy or electrical energy.

Figure 1:
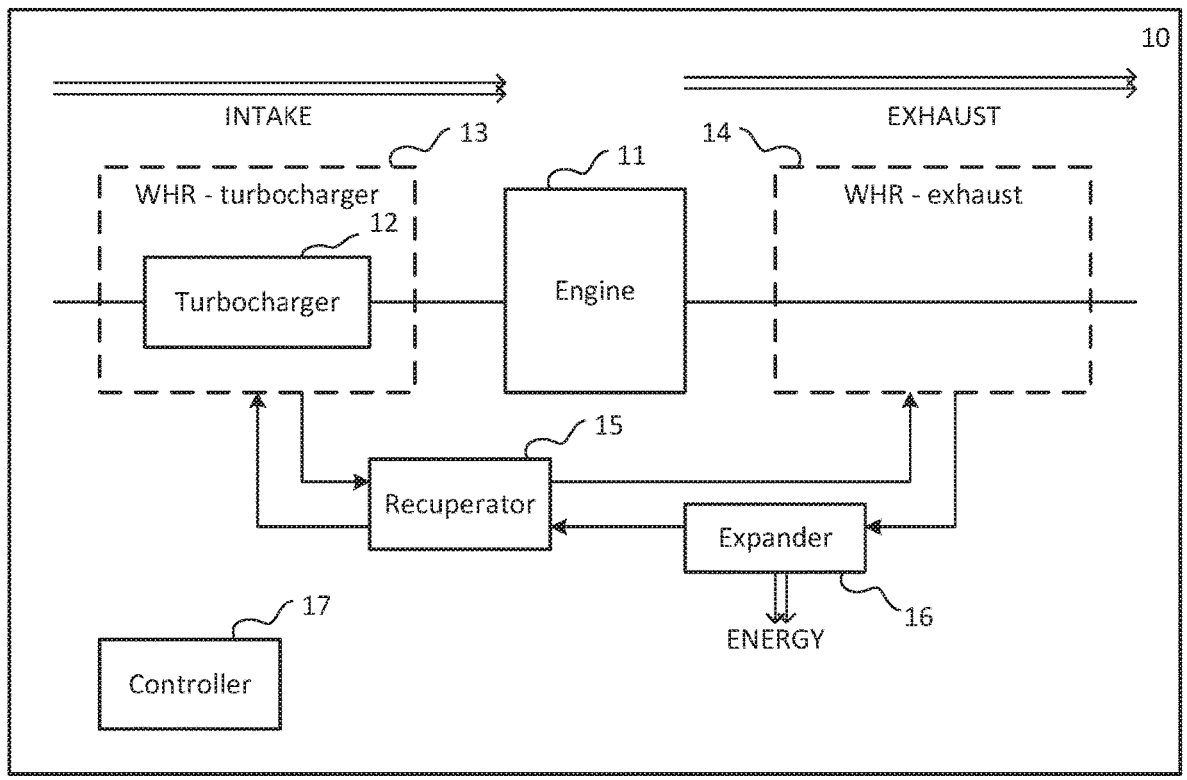
FIG. 1 is a block diagram representation of components of an engine system with waste heat recovery.

FIG. 1 is a block diagram representation of components of an engine system 10 with WHR according to an embodiment of the present disclosure. The system 10 includes an engine 11, a turbocharger 12 on the intake side of the engine 11, and a WHR subsystem including a turbocharger waste heat recovery portion 13 that recovers waste heat from the turbocharger 12, an exhaust waste heat recovery portion 14 that recovers waste heat on the exhaust side of the engine 11, a recuperator 15, and an expander 16. The recuperator 15 transfers thermal energy from fluid in the turbocharger waste heat recovery portion 13 to fluid provided to the exhaust waste heat recovery portion 14. Thermal energy in the fluid in the exhaust waste heat recovery portion 14 is converted into another form of energy in the expander 16. The system 10 further includes a controller 17 coupled to the WHR subsystem to control components of the WHR subsystem for WHR through different states of engine operation and WHR operation. The controller 17 comprises a computing device. In one or more embodiments, the controller 17 is incorporated into an engine or powertrain electronic module or other electronic module. In other embodiments, the controller 17 is a stand-alone computing device. Portions of the WHR control techniques of the present disclosure may be implemented as computer-executable instructions executed by the controller 17.

Figure 2:
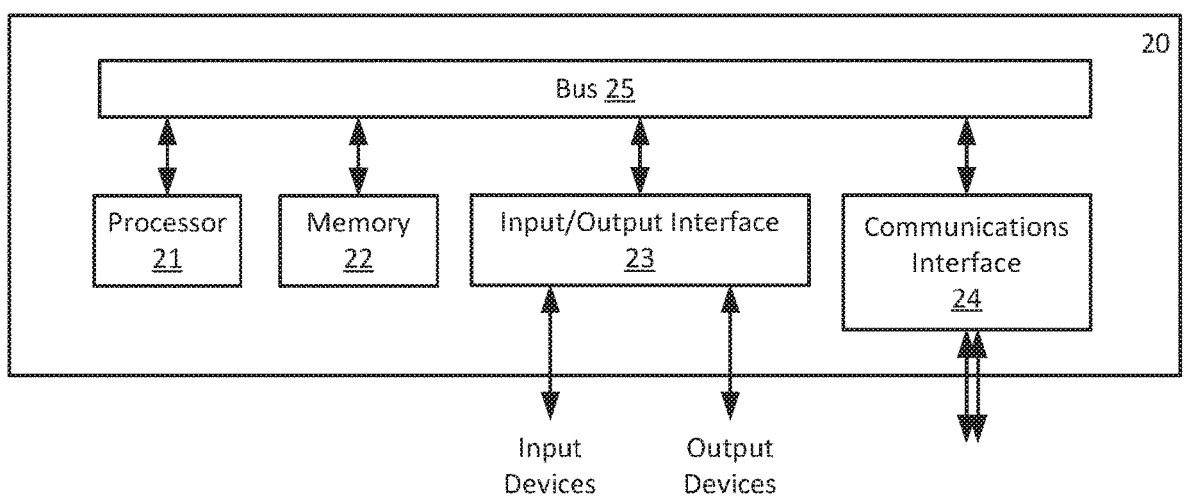
FIG. 2 illustrates an example of a computing device.

FIG. 2 illustrates an example of a computing device 20 (e.g., the controller 17) that includes a processor 21, a memory 22, an input/output interface 23, and a communication interface 24. A bus 25 provides a communication path between two or more of the components of the computing device 20. The components shown are provided by way of illustration and are not limiting. The computing device 20 may include additional or fewer components, or multiple of the same component.

The processor 21 represents one or more of a general-purpose processor, digital signal processor, microprocessor, microcontroller, application specific integrated circuit (ASIC), field programmable gate array (FPGA), other circuitry effecting processor functionality, or a combination thereof, along with associated logic and interface circuitry.

The memory 22 represents one or both of volatile and non-volatile memory for storing information (e.g., instructions and data). Examples of the memory 22 include semiconductor memory devices such as EPROM, EEPROM, flash memory, RAM, or ROM devices, and the like.

Portions of the WHR control techniques may be implemented as computer-readable instructions in the memory 22 of the computing device 20, executed by the processor 21.

The input/output interface 23 represents electrical components and optional code that together provide an interface from the internal components of the computing device 20 to external components. Examples include a driver integrated circuit with associated programming.

The communication interface 24 represents electrical components and optional code that together provides an interface from the internal components of the computing device 20 to external networks. The communication interface 24 may be bi-directional, such that, for example, data may be sent from the computing device 20, and instructions and updates may be received by the computing device 20.

The bus 25 represents one or more interfaces between components within computing device 20. For example, the bus 25 may include a dedicated connection between the processor 21 and the memory 22 as well as a shared connection between the processor 21 and multiple other components of the computing device 20.

An embodiment of the disclosure relates to a non-transitory computer-readable storage medium (e.g., a memory 22) having computer code thereon for performing various computer-implemented operations. The term "computer-readable storage medium" is used herein to include any medium that is capable of storing or encoding a sequence of instructions or computer codes for performing the operations, methodologies, and techniques described herein. The media and computer code may be those specially designed and constructed for the purposes of the embodiments of the disclosure, or they may be of the kind well known and available to those having skill in the computer software arts.

Figure 3:
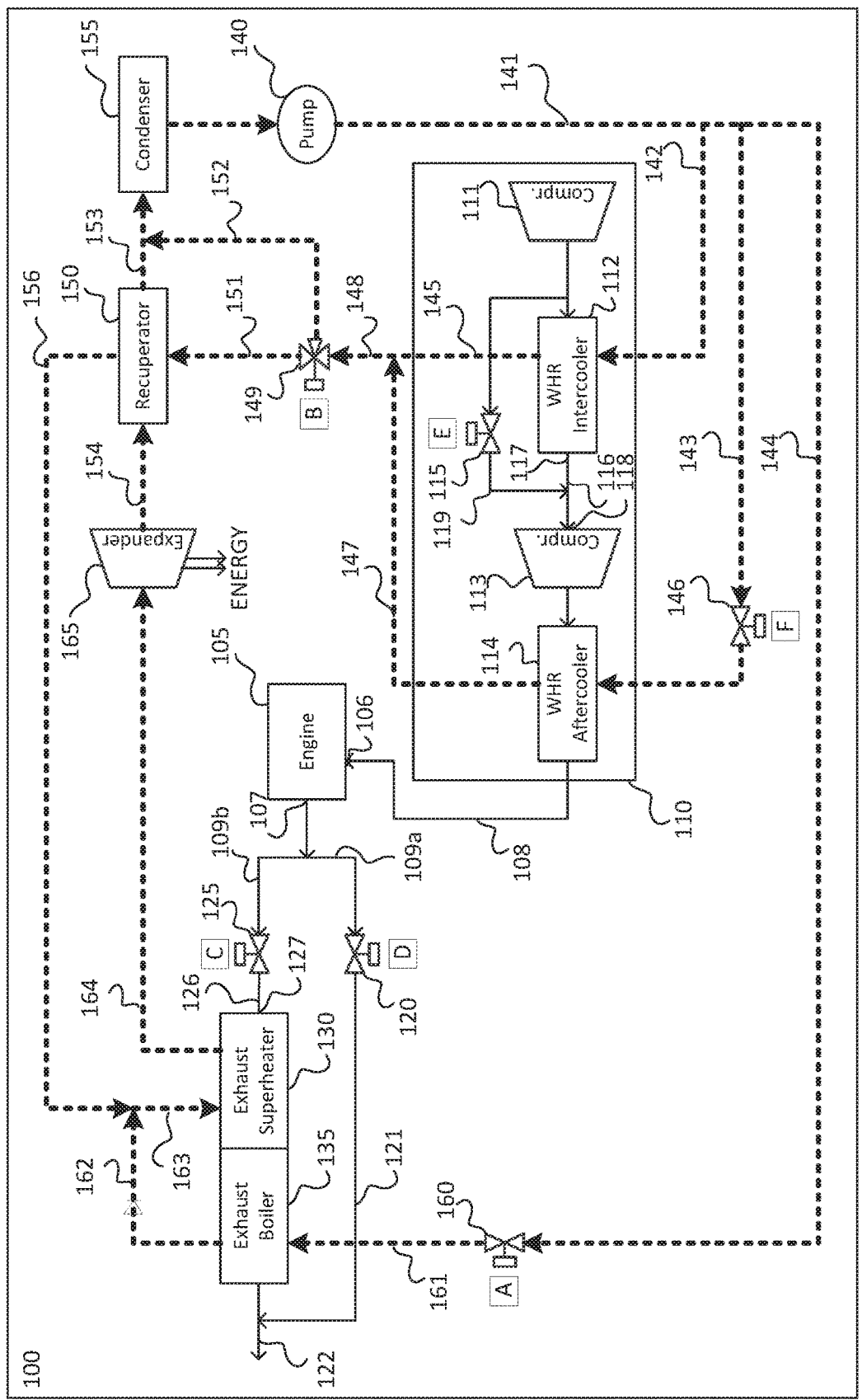
FIG. 3 is a schematic representation of an organic Rankine cycle based waste heat recovery system.

FIG. 3 is a schematic representation of a system 100 according to an embodiment of the present disclosure. The system 100 implements ORC-based WHR.

The system 100 includes a two-stage, turbocharged engine 105. The engine 105 includes one or more engine air intake ports 106 and one or more engine exhaust ports 107. Air flows from an ambient air intake (e.g., air from outside of the vehicle, and/or air from within the engine compartment) to the engine air intake ports 106, and exhaust is expelled from the engine exhaust ports 107 to the environment, or through exhaust treatment components to the environment. Some of the components related to intake and exhaust flows are described next.

Air received at one or more of the engine air intake ports 106 is compressed air from a turbocharger section 110, which includes a first compressor 111, an intercooler 112, a second compressor 113, an aftercooler 114, and an intercooler bypass valve 115 (labeled 'E'). Fresh air enters the first compressor 111 and is compressed. Because the compression introduces thermal energy into the air, the compressed air is fed into the intercooler 112 where it is cooled. The compressed cooled air is fed into the second compressor 113 and further compressed, then cooled in the aftercooler 114 before being provided through an engine intake conduit 108 to the engine 105 at the engine air intake port 106. The intercooler bypass valve 115 is selectively controlled between an open position and a closed position to regulate a desired temperature for air entering the second compressor 113. For example, if the temperature of air measured in a second compressor intake conduit 116 (e.g., at an outlet 117 of the intercooler 112, an intake port 118 of the second compressor 113, or between the outlet 117 and the intake port 118) crosses a threshold, is above a threshold, or is within a predefined range, the intercooler bypass valve 115 may be selectively controlled to a partially open position or a fully open position, thereby allowing fresh air at a warmer temperature to flow through a bypass conduit 119 and mix with (to heat) the air in the second compressor intake conduit 116. The term "conduit" as used in the present disclosure refers to piping, tubing, extrusions, bores, or other channels that allow for the passage of fluid, where fluid may be in a gaseous state, a liquid state, or a combination thereof.

Exhaust expelled from the engine 105 through one or more of the engine exhaust ports 107 enters a first exhaust conduit 109a and a second exhaust conduit 109b. The first exhaust conduit 109a extends to a selectively controlled exhaust WHR bypass valve 120 (labeled 'D'). If the exhaust WHR bypass valve 120 is in an open position, exhaust flows through the exhaust WHR bypass valve 120 and through an exhaust bypass conduit 121 to an exhaust conduit 122. The second exhaust conduit 109b extends to a selectively controlled superheater valve 125 (labeled 'C'). If the superheater valve 125 is in an open position, exhaust flows through the superheater valve 125 and through a superheater exhaust intake conduit 126 to an intake port 127 of an exhaust superheater 130, then to an exhaust boiler 135 before being expelled through the exhaust conduit 122. The opening/closing of the exhaust WHR bypass valve 120 and the superheater valve 125 is coordinated, such that, in one embodiment, one of the exhaust WHR bypass valve 120 and the superheater valve 125 is open while the other is closed. In one or more embodiments, the superheater valve 125 is controlled to be open and the exhaust WHR bypass valve 120 is controlled to be closed when a temperature of exhaust expelled from the engine 105 (measured at an engine exhaust port 107, in the first exhaust conduit 109*a*, or in the second exhaust conduit 109*b*) crosses a threshold, is above a threshold, or is within a predefined range; otherwise, the exhaust WHR bypass valve 120 is controlled to be open and the superheater valve 125 is controlled to be closed.

The system 100 further includes a closed fluid flow WHR subsystem, where a working fluid is circulated through the WHR subsystem to absorb thermal energy from one or more components and provide thermal energy to one or more components. Excess thermal energy may be converted to another form of energy, such as mechanical or electrical energy. Some of the components related to fluid flow through the WHR subsystem are described next.

A pump 140 causes the working fluid to flow through a distribution conduit 141 and be distributed into various tributaries such as intercooler WHR inlet conduit 142, aftercooler feed conduit 143 and boiler feed conduit 144. The working fluid flows through the intercooler WHR inlet conduit 142 through or around the intercooler 112 and into a intercooler outlet conduit 145, to absorb thermal energy extracted by the intercooler 112 from the intake flow passing through the intercooler 112 (compressed air from the compressor 111). The working fluid flows through the aftercooler feed conduit 143 to an aftercooler valve 146 (labeled 'F'). If the aftercooler valve 146 is open, the working fluid flows through the aftercooler valve 146, through or around the aftercooler 114 and into an aftercooler outlet conduit 147, to absorb thermal energy extracted by the aftercooler 114 from the gaseous flow passing through the aftercooler 114 (compressed air from the compressor 113). The working fluid flowing in the intercooler outlet conduit 145 and the aftercooler outlet conduit 147 are combined to flow through a turbocharger WHR outlet conduit 148 to a three-way recuperator valve 149 (labeled 'B'). The recuperator valve 149 is selectively controlled to either direct all of the working fluid in the turbocharger WHR outlet conduit 148 towards a recuperator 150, direct all of the working fluid in the turbocharger WHR outlet conduit 148 towards a condenser 155, or divide the working fluid in the turbocharger WHR outlet conduit 148 such that a portion flows towards the recuperator 150 and a portion flows towards the condenser 155. More specifically, the recuperator valve 149 may be controlled such that all of the working fluid in the turbocharger WHR outlet conduit 148 flows through the recuperator valve 149 into a first recuperator WHR inlet conduit 151 and to the recuperator 150; or the recuperator valve 149 may be controlled such that all of the working fluid in the turbocharger WHR outlet conduit 148 flows through the recuperator valve 149 into a recuperator bypass conduit 152 which feeds into a condenser WHR inlet conduit 153 to the condenser 155; or the recuperator valve 149 may be controlled such that a portion of the working fluid in the turbocharger WHR outlet conduit 148 flows through the recuperator valve 149 into the first recuperator WHR inlet conduit 151, and a portion flows through the recuperator valve 149 into the recuperator bypass conduit 152.

The recuperator 150 further receives the working fluid through a second recuperator WHR inlet conduit 154. The working fluid in the second recuperator WHR inlet conduit 154 may be at least partially in a vapor state. The recuperator 150 transfers thermal energy from the working fluid in the second recuperator WHR inlet conduit 154 to the working fluid in a recuperator outlet conduit 156. The working fluid from the recuperator outlet conduit 156 is combined with the working fluid from a boiler outlet conduit 162 in a superheater WHR inlet conduit 163, with the combined working fluid provided to the exhaust superheater 130.

The condenser 155 receives the working fluid from the condenser WHR inlet conduit 153, and cools the working fluid for recirculation by the pump 140. The working fluid in the condenser WHR inlet conduit 153 may be partially in a vapor state, and the condenser 155 condenses the vapor to liquid.

A boiler valve 160 (labeled 'A') is positioned in line with the boiler feed conduit 144. When the boiler valve 160 is open, the working fluid in the boiler feed conduit 144 flows through the boiler valve 160 into a boiler WHR inlet conduit 161 and is circulated through the exhaust boiler 135 to absorb thermal energy from the exhaust gas, and provide thermal energy to the working fluid in the boiler outlet conduit 162. The working fluid in the boiler outlet conduit 162 enters the superheater WHR inlet conduit 163 and is circulated through the exhaust superheater 130 to further absorb thermal energy from the exhaust gas.

The superheater 130 provides thermal energy to the working fluid in a superheater outlet conduit 164. The working fluid in the superheater outlet conduit 164 is converted partially or fully to a vapor state by the addition of thermal energy. The working fluid in the superheater outlet conduit 164 flows to an expander 165.

The expander 165 converts thermal energy in the working fluid in the superheater outlet conduit 164 into another form of energy, such as mechanical or electrical energy. The working fluid exits the expander 165 through the second recuperator WHR inlet conduit 154 and flows through the recuperator 150 to the condenser 155.

Waste heat is thus recovered from engine exhaust and from a turbocharging system (e.g., the turbocharger section 110 in FIG. 3).

A Rankine cycle is implemented by the pump 140, the exhaust boiler 135/exhaust superheater 130, the expander 165, and the condenser 155. An organic fluid with a high molecular mass and relatively low boiling temperature is used in the WHR subsystem; and thus the Rankine cycle is an ORC. The low boiling temperature allows for operation at the temperatures available in the WHR subsystem, as well as a faster ramp up of the ORC.

Thermal energy recovered from the turbocharger section 110 is used to increase the temperature of the working fluid in the ORC for improved WHR.

In operation, the pump 140 is turned on or off, and the valves (boiler valve 160, recuperator valve 149, superheater valve 125, exhaust WHR valve 120, intercooler bypass valve 115, aftercooler valve 146) opened or closed, based on the state and loading conditions of the engine. Table 1 provides an example of a scheme for control of the pump 140 and valves according to an embodiment of the present disclosure. A description of the scheme follows Table 1, where the valves are referred to as valves A-F rather than by reference numeral.

TABLE 1

| WHR State | WHR subsystem | Pump (140) | Valve A (160) | Valve B (149) | Valve C (125) | Valve D (120) | Valve E (115) | Valve F (146) |
|---|---|---|---|---|---|---|---|---|
| 1 | Off | Off | Closed | To condenser | Closed | Open | Open | Closed |
| 2 | On, initial | On | Closed | To condenser | Closed | Open | Variable | Variable |
| 3 | On, ramp up 1 | On | Closed | Variable | Open | Closed | Variable | Variable |
| 4 | On, ramp up 2 | On | Variable | To recuperator | Open | Closed | Variable | Variable |
| 5 | On, steady state | On | Variable | To recuperator | Open | Closed | Variable | Variable |
| 6 | Off, ramp down 1 | On | Closed | Variable | Open | Closed | Variable | Variable |
| 7 | Off, ramp down 2 | On | Closed | To condenser | Closed | Open | Variable | Variable |

State 1

When the engine is off, the WHR subsystem is in an off state, where the pump 140 is off, valve A is closed, valve B is open to the condenser 155, valve C is closed, valves D and E are open, and valve F is closed.

State 2

When the engine is started, the WHR subsystem is turned on. The pump 140 is turned on to begin circulating the working fluid in the WHR subsystem. Because the working fluid in the WHR subsystem has not yet reached a temperature suitable for the ORC, valve C remains closed and valve D remains open to route the exhaust around the exhaust superheater 130 and the exhaust boiler 135, valve A remains closed because the exhaust boiler 135 is not in use, and valve B continues to direct the working fluid to the condenser 155 to bypass the recuperator 150. Valve E starts out open and is subsequently controlled between open and closed such that a portion (or none) of the working fluid from the compressor 111 flows through valve E to bypass the intercooler 112, so that a temperature of the working fluid in the second compressor intake conduit 116 reaches and is regulated at approximately a desired value for the working fluid in the second compressor intake conduit 116. Valve F starts out closed and is subsequently controlled between open and closed such that a portion (or none) of the working fluid in the aftercooler feed conduit 143 flows through valve F and through or around the aftercooler 114, so that a temperature of the working fluid in the engine intake conduit 108 reaches and is regulated at approximately a desired value for the working fluid in the engine intake conduit 108.

State 3

As the engine continues to run and the working fluid flows through the turbocharger section 110, the WHR subsystem the working fluid increases in temperature. When the working fluid in the turbocharger WHR outlet conduit 148 reaches a desired target temperature value for the working fluid in the turbocharger WHR outlet conduit 148, the WHR subsystem enters a first ramp up state (on, ramp up 1). The target temperature value for the working fluid in the turbocharger WHR outlet conduit 148 is defined based on conditions such as working fluid type, working fluid system pressure, and charge air temperature to be controlled at the engine intake. In the first ramp up state, valve C is opened and then valve D is closed so that the exhaust is directed through the exhaust superheater 130, and valve B is controlled to direct a portion of the working fluid in the turbocharger WHR outlet conduit 148 through the first recuperator WHR inlet conduit 151 and the recuperator 150 and to the exhaust superheater 130 by way of the recuperator outlet conduit 156 and the superheater WHR inlet conduit 163, to begin the ORC. The turbocharger section 110 operates as a preheater. As thermal energy is transferred from the exhaust to the working fluid by the exhaust superheater 130, the temperature of the working fluid (e.g., at an inlet to the expander 165 or at an outlet of the exhaust superheater 130) increases. Valve B is controlled to direct an increasing amount of the working fluid in the turbocharger WHR outlet conduit 148 to the recuperator 150, eventually directing the entire flow from the turbocharger WHR outlet conduit 148 to the recuperator 150.

State 4

When the working fluid in the superheater outlet conduit 164 reaches approximately a desired target temperature value for the working fluid in the superheater outlet conduit 164, the WHR subsystem enters a second ramp up state (on, ramp up 2). The target temperature value for the working fluid in the superheater outlet conduit 164 is based on the system, such as based on a temperature limit for stability of the selected working fluid and a temperature value at which a desired performance of the exhaust WHR portion is achieved. In the second ramp up state, valve B directs the entire flow from the turbocharger WHR outlet conduit 148 to the recuperator 150. The pump 140 is controlled to increase a flow rate through the turbocharger section 110 (e.g., through the intercooler WHR inlet conduit 142 and the aftercooler feed conduit 143), and valve A is opened to circulate the working fluid through the exhaust boiler 135 to absorb additional thermal energy from the exhaust and provide the additional thermal energy to the working fluid circulating through the exhaust superheater 130. Thus, in the second ramp up state, a temperature of the working fluid in the WHR subsystem is rapidly increased.

State 5

When the temperature of the working fluid in the superheater outlet conduit 164 stabilizes at approximately the desired value for the working fluid in the superheater outlet conduit 164, the WHR subsystem enters a steady state. In the steady state, valve A is in a variable state, and the pump 140 is controlled to increase or decrease a flow rate through the turbocharger section 110 to correspondingly increase or decrease the temperature of the working fluid in the superheater outlet conduit 164. In this way, the temperature of the working fluid in the superheater outlet conduit 164 is regulated at approximately the desired value for the working fluid in the superheater outlet conduit 164. The WHR subsystem adjusts during engine operation in response to changing engine operating conditions, load, or speed.

If a load on the engine 105 changes sufficiently such that the WHR subsystem in the steady state is unable to regulate the temperature of the working fluid in the superheater WHR inlet conduit 163 at approximately the desired value for the working fluid in the superheater WHR inlet conduit 163, the engine state may return to the previous state 4 (the ramp up state 2).

State 6

When the engine is turned off (or when a command is otherwise issued to shut down the WHR subsystem), the WHR subsystem enters a first ramp down state (ramp down 1), in which WHR continues until the temperature of the working fluid in the turbocharger WHR outlet conduit 148 decreases to a desired WHR shutdown value. As engine load decreases (e.g., at engine spin-down or as accessories are shut off), exhaust flow through the engine exhaust ports 107 decreases, and exhaust flow through the superheater 130 correspondingly decreases. The temperature in the superheater outlet conduit 164 thus decreases, resulting in the pump 140 reducing flow as the pump 140 continues to regulate the temperature of the working fluid in the superheater outlet conduit 164 to approximately the desired value for the working fluid in the superheater outlet conduit 164. As the temperature of the working fluid in the WHR subsystem decreases, valve B is controlled to divert increasingly more of the working fluid in the turbocharger WHR outlet conduit 148 to the condenser 155 and away from the recuperator 150.

Note that the engine may be turned off (or a command issued to turn off the WHR subsystem) while the WHR subsystem is in any one of the states 2-5. If the engine is turned off while valve A is open, valve A is closed in state 6.

State 7

When valve B is controlled to direct all of the working fluid in the turbocharger WHR outlet conduit 148 to the condenser 155, the ORC ends, and the WHR subsystem enters a second ramp down state (ramp down 2). In the second ramp down state, valve D is opened and then valve C is closed, thus any remaining exhaust is bypassed through valve D around the exhaust superheater 130 and the exhaust boiler 135.

When the engine ceases operation (e.g., engine rotation is measured at zero revolutions per minute), the pump 140 is turned off, valve E is opened, and valve F is closed, such that the WHR subsystem enters the first (off) state.

Figure 4:
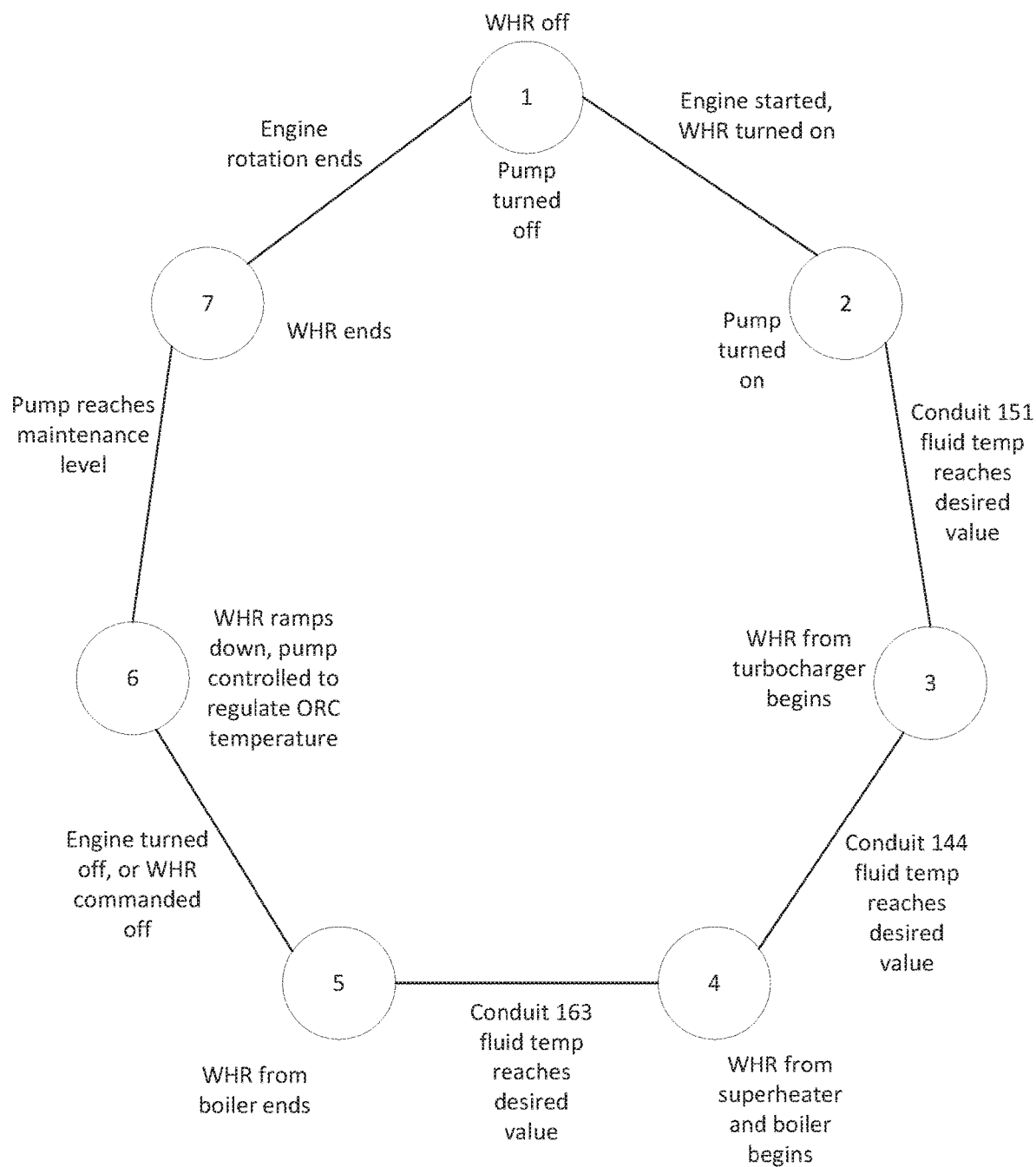
FIG. 4 is a state diagram of an organic Rankine cycle based waste heat recovery control technique.

FIG. 4 is a state diagram corresponding to Table 1, according to an embodiment of the present disclosure.

As used herein, the term "approximately" is used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

What is claimed is:

1. An engine waste heat recovery system, comprising:
   a turbocharger waste heat recovery portion;
   an exhaust waste heat recovery portion;
   an expander in the exhaust waste heat recovery portion, the expander configured to receive a working fluid in a superheated form and convert thermal energy in the working fluid into mechanical energy or electrical energy;
   a condenser configured to condense the working fluid for recirculation through the engine waste heat recovery system;
   a recuperator fluidly coupled between the expander and the condenser to allow the working fluid to flow from the expander to the condenser, the recuperator further configured to transfer thermal energy to a flow of the working fluid from the turbocharger waste heat recovery portion;
   a plurality of valves, each of the plurality of valves fluidly coupled to one of the turbocharger waste heat recovery portion and the exhaust waste heat recovery portion, the plurality of valves comprising a three-way valve between the recuperator and the turbocharger waste heat recovery portion, the three way valve configured to selectively direct (a) all of the working fluid to the recuperator, (b) all of the working fluid to the condenser, and (c) a portion of the working fluid to the recuperator and a remainder of the working fluid to the condenser; and
   a controller electrically coupled to the plurality of valves, the controller configured to selectively control the plurality of valves to selectively circulate the working fluid through the engine waste heat recovery system.

2. The system of claim 1, further comprising a pump, wherein the controller is further configured to control the pump to selectively adjust a flow rate of the working fluid in the engine waste heat recovery system to regulate a temperature in the exhaust waste heat recovery portion at a desired level.

3. The system of claim 1, wherein the turbocharger waste heat recovery portion is configured for waste heat recovery from an intercooler and from an aftercooler.

4. The system of claim 3, wherein the controller is configured to selectively control one of the plurality of valves to allow fluid flow to the aftercooler through the valve.

5. The system of claim 3, wherein the controller is configured to selectively control one of the plurality of valves to allow fluid flow from the turbocharger waste heat recovery portion through the valve to the recuperator.

6. The system of claim 1, wherein the exhaust waste heat recovery portion and the condenser implement a Rankine cycle.

7. The system of claim 6, wherein the controller is configured to selectively control one of the plurality of valves to allow the working fluid to flow to the exhaust waste heat recovery portion through the one of the plurality of valves.

8. An engine waste heat recovery system, comprising:
a turbocharger waste heat recovery portion configured to circulate a working fluid; an exhaust waste heat recovery portion configured to circulate the working fluid;
an expander in the exhaust waste heat recovery portion, the expander configured to receive the working fluid in a superheated form and convert thermal energy in the superheated working fluid to mechanical or electrical energy;
a recuperator fluidly coupled to the expander and to the turbocharger waste heat recovery portion, the recuperator configured to receive the working fluid from the expander, receive the working fluid from the turbocharger waste heat recovery portion, transfer thermal energy from the working fluid received from the expander to the working fluid received from the turbocharger waste heat recovery portion, and provide the working fluid to the exhaust waste heat recovery portion;
a plurality of valves, each of the plurality of valves fluidly coupled to one of the turbocharger waste heat recovery portion and the exhaust waste heat recovery portion, the plurality of valves comprising a three-way valve between the recuperator and the turbocharger waste heat recovery portion, the three way valve configured to selectively direct (a) all of the working fluid to the recuperator, (b) all of the working fluid to the condenser, and (c) a portion of the working fluid to the recuperator and a remainder of the working fluid to the condenser; and
a controller configured to control the plurality of valves and to control a flow rate of the working fluid in the waste heat recovery system, to regulate a temperature of a Rankine cycle implemented in the exhaust waste heat recovery portion.

9. The system of claim 8, wherein the plurality of valves include: a first valve configured to control fluid flow from the turbocharger waste heat recovery portion; a second valve configured to control fluid flow to the turbocharger waste heat recovery portion; and a third valve configured to control fluid flow to the exhaust waste heat recovery portion.

10. The system of claim 9, further comprising a pump, wherein the controller is configured to, at startup of the engine waste heat recovery system, control the pump to initiate pumping of the working fluid through the engine waste heat recovery system.

11. The system of claim 9, wherein the controller is configured to control the first valve to direct the working fluid from the turbocharger waste heat recovery portion to the recuperator.

12. The system of claim 9, wherein the controller is configured to control the second valve to direct the working fluid to the turbocharger waste heat recovery portion.

13. The system of claim 9, wherein the controller is configured to control the third valve to direct the working fluid towards an inlet of an exhaust boiler.

14. The system of claim 8, further comprising a pump, wherein the controller is configured to, at shutdown of the engine waste heat recovery system, control the pump to decrease a flow of the working fluid in the waste heat recovery system to regulate the temperature of the Rankine cycle.

* * * * *